G. DRIES.
LIQUID DEVICE FOR VEHICLES.
APPLICATION FILED FEB. 3, 1914.
1,257,330.
Patented Feb. 26, 1918.
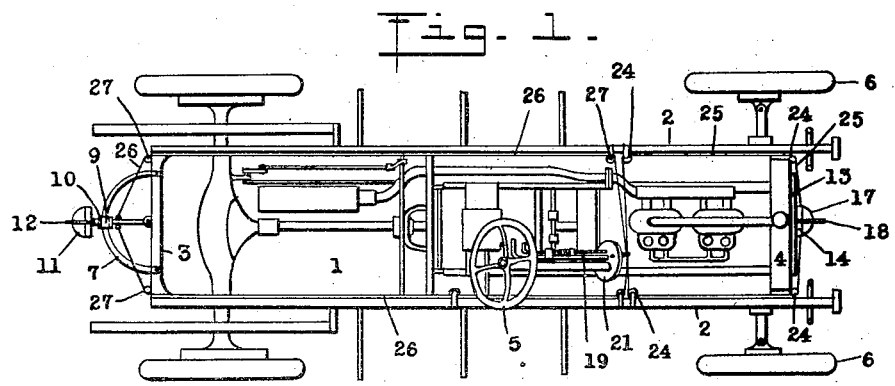
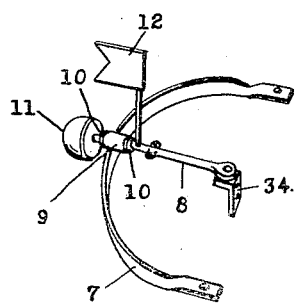
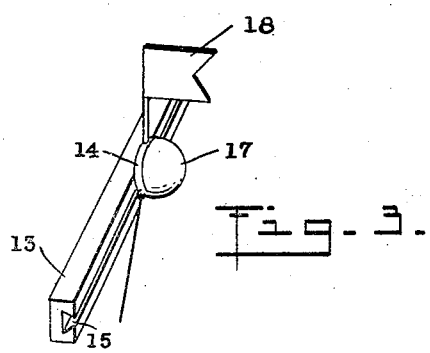
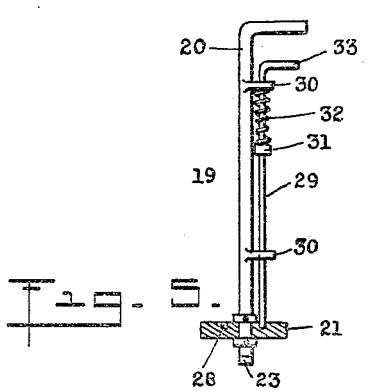
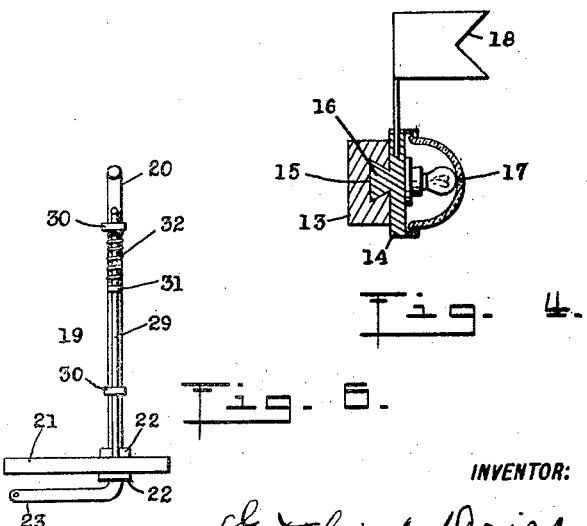
WITNESSES:
Howard P. King
Janet A. Ayers
INVENTOR:
Gottfried Dries,
BY
Russell M. Everett,
ATTORNEY.

UNITED STATES PATENT OFFICE.

GOTTFRIED DRIES, OF NEWARK, NEW JERSEY.

SIGNAL DEVICE FOR VEHICLES.

1,257,330.    Specification of Letters Patent.    Patented Feb. 26, 1918.

Application filed February 3, 1914. Serial No. 816,148.

*To all whom it may concern:*

Be it known that I, GOTTFRIED DRIES, a citizen of the United States, and a resident of Newark, in the county of Essex and State of New Jersey, have invented certain new and useful Improvements in Signal Devices for Vehicles, of which the following is a description.

The objects of this invention are to provide for a motor vehicle an improved signal adapted to indicate an intention upon the operator's part that a turn is to be made; to move the signal bodily from side to side of a motor vehicle; to provide such signals at opposite ends of a motor vehicle; to provide improved means for operating said signals; to operate both signals simultaneously; to position such operating means convenient to the steering wheel of the vehicle; to secure simplicity of construction and operation, and to obtain other advantages and results as may be brought out in the following description.

Referring to the accompanying drawings, in which like numerals of reference indicate the same parts throughout the several views:—

Figure 1 is a plan of a motor vehicle chassis to which my invention has been applied;

Fig. 2 is a perspective view of a swinging signal shown at the rear of the motor vehicle of Fig. 1;

Fig. 3 is a perspective view of a sliding signal shown at the front end of the motor vehicle in Fig. 1;

Fig. 4 is a transverse sectional view through the sliding signal shown in Fig. 3.

Fig. 5 is an elevation of the means for operating said signals, with parts broken away, and Fig. 6 is an elevation of the operating means taken at right angles to the position shown in Fig. 5.

In the specific embodiment of the invention illustrated in said drawings, the reference numeral 1 indicates an automobile or motor vehicle chassis having the usual side frames 2, 2 joined at their rear end by the cross beam 3 and carrying at their front end a radiator 4. A steering wheel 5 controls front wheels 6, 6 as is usual and customary in the art.

In carrying out my invention, I provide at the back of the motor vehicle a horizontally disposed arcuate track 7, preferably semicircular, with its ends secured to the cross beam 3 and its middle portion extending rearwardly of the vehicle. Pivoted to a bracket 34 on the cross beam 3 at the center of curvature of the arcuate track is a signal arm 8 supported at its outer end by engagement with the track. A roller 9 is carried by the arm 8, said roller being mounted thereon in proper position to ride upon the track 7 and reduce the frictional resistance occasioned when swinging the arm upon the track. Suitable collars 10, 10 at opposite ends of the roller retain the same against longitudinal movement on the arm. Obviously the free end of this arm may be swung readily from side to side of the vehicle, and in order to render such movement easily apparent to others approaching from the rear, I attach a lamp 11 to the free end of said arm 8. Also a flag 12 may be carried by the arm 8 near its free end so as to be readily seen.

At the front of the motor vehicle I provide a device for indicating to those ahead or in front of the machine any change in course which the operator intends to make. This device I have shown in Fig. 1 as mounted in front of the radiator 4, and comprising a horizontally disposed track 13 extending from side to side of the vehicle and adapted to slidably receive a slide block 14. To this end the track 13 has a groove 15 cut longitudinally into its front side, said groove being enlarged or dovetailed inwardly of the track. A projection 16 corresponding in shape to the cross section of the inwardly flared groove 15 and forming part of the sliding block 14 engages within said groove 15 and supports the sliding block in slidable engagement with the track 13. Upon the front of this slide block is a lamp 17, and when so desired a flag 18 may also be attached to the slide block for more positively attracting the attention of approaching parties when a deviation in the course is intended to be made.

Obviously the front lamp 17 and the rear lamp 11 are to be moved toward the same side of the vehicle when a turn in that direction is intended, and in order to so shift both the lamps I provide a shifting lever 19 for the same adjacent the steering wheel 5. This shifting lever comprises a cane-like handle 20 projecting upwardly from a base plate 21, said handle having collars 22, 22 above and below the base plate for holding the handle in place. Below the base plate the handle is bent laterally, forming an arm 23. Attached to the outer end of this arm 23 and running over suitable pulleys 24 on the chassis is a flexible connection 25 to the slide block 14 of the front lamp; this flexible connection extends in opposite directions from the arm 23 to the sides of the vehicle body and along said sides to the front of the body where it is connected to the slide block and is adapted to pull the slide block to either end of its track as may be desired. Also attached to the arm 23 and extending in opposite directions from the same is a flexible connection 26 which approaches the swinging arm 8 at the rear of the vehicle from opposite sides, said connection being attached to the swinging arm so as to actuate it in either direction according to the way in which the shifting lever 19 is turned, it being understood that suitable pulleys 27 may be employed to conduct the connection in the proper direction. By the construction thus described, the members of said flexible connection are out of the way, that is, will not interfere with the operation or repair of the engine or shaft or other movable parts, and at the same time are accessible and obtain a direct pull upon the signal means for shifting them. It will be obvious that by this means both of the lamps are shifted at the same time and in the same direction by the same shifting lever, and will indicate to parties both in front and behind the vehicle the intentions of the operator.

In order that the signals may be maintained in predetermined positions, such for instance, as neutral or straight ahead position I notch the base plate, as at 28, and provide a positioning rod 29 upon the shifting lever 19 adapted to enter the notches when the lever is placed in any one of the predetermined positions. To this end I have shown ears 30, 30 extending laterally from the shifting lever and apertured to slidably support said rod 29. A collar 31 held fast upon the positioning rod prevents longitudinal displacement of a spring 32 which surrounds said rod and presses at its other end against the ear 30 above the collar and thereby normally holds the positioning rod in its lowered position. The upper end of said rod is preferably bent laterally forming a grip portion 33 for convenient and ready manipulation by the operator.

In operation, as the motor vehicle is traveling along, the shifting lever 19 is held by the positioning rod 29 in its neutral position, that is, so that the signals are at substantially the center of their tracks, and when the operator intends to turn in one direction or the other he first draws the positioning rod upward and swings the operating lever in the proper direction to move the signal to the side of the machine toward which he intends to turn. This movement of both of the signals will then attract the attention of any parties either in front or behind and indicate to them the intentions of the operator. Having thus set his signals, the operator can then turn his vehicle without danger to himself or to others.

It will be obvious that a signal device may be constructed and operated at either end of a vehicle instead of a signal at both ends, and it is to be understood in construing the appended claim that although I have shown signals for both ends of a vehicle I do not limit myself thereto except as expressly stated in the claim. Various other modifications of the mechanical embodiment of my invention readily apparent to those versed in the art may be made without departing from the spirit or scope of the invention.

Having thus described the invention what I claim is:—

A signal device for vehicles, comprising in combination with the body of a vehicle, signals at the front and rear of said vehicle body adapted to be operated simultaneously in the same direction and indicate thereby an intended change of direction of movement of the vehicle, a lever adjacent the steering wheel of the vehicle extending below the floor with an arm under the floor normally lengthwise of the vehicle, said lever adapted to be manually turned to swing said arm, a positioning rod adjacent said lever longitudinally thereof whereby the lever may be positively held in certain positions to which it is turned, and pairs of flexible members attached to and extending laterally in opposite directions from said arm to the sides of the vehicle body, the members of each pair extending one forwardly and one rearwardly at the side of the vehicle body to the front and back ends thereof and connected threat to the said signals, whereby said members will pull the signals toward the sides of the vehicles when the arm is swung by turning the lever.

GOTTFRIED DRIES.

Witnesses:
 HOWARD P. KING,
 JANET A. AYERS.

It is hereby certified that in Letters Patent No. 1,257,330, granted February 26, 1918, upon the application of Gottfried Dries, of Newark, New Jersey, for an improvement in "Signal Devices for Vehicles," an error appears requiring correction as follows: On the drawing, title of invention, for "Liquid Device for Vehicles" read *Signal Device for Vehicles;* and that the said Letters Patent should be read with this correction therein that the same may conform to the record of the case in the Patent Office.

Signed and sealed this 16th day of April, A. D., 1918.

[SEAL.]

F. W. H. CLAY,

*Acting Commissioner of Patents.*

Cl. 116—31.7.